United States Patent [19]

Fitzner

[11] Patent Number: 4,958,119
[45] Date of Patent: Sep. 18, 1990

[54] VOLTAGE REGULATORS FOR PERMANENT MAGNET ALTERNATORS

[75] Inventor: Arthur O. Fitzner, Fond du Lac, Wis.

[73] Assignee: Brunswick Corporation, Skokie, Ill.

[21] Appl. No.: 258,570

[22] Filed: Oct. 17, 1988

[51] Int. Cl.$^5$ .......................... H02J 7/14; H02P 9/00
[52] U.S. Cl. ...................................... 322/91; 320/59; 322/94
[58] Field of Search ...................... 322/91, 94; 320/59

[56] References Cited

U.S. PATENT DOCUMENTS

| 4,401,936 | 8/1983 | Van Opijnen | 322/94 X |
| 4,410,847 | 10/1983 | Staerzl | 320/61 X |
| 4,431,959 | 2/1984 | Remmers | 320/59 |
| 4,458,195 | 7/1984 | Piteo | 322/94 |
| 4,659,978 | 4/1987 | Dogadko | 320/59 X |

Primary Examiner—R. J. Hickey
Attorney, Agent, or Firm—Andrus, Sceales, Starke & Sawall

[57] ABSTRACT

A voltage regulator for an internal combustion engine having a permanent magnet alternator and utilizing an SCR/diode bridge rectifier includes crowbar SCR overvoltage protection means. To assure that the crowbar SCR has an adequate period in which to cool off after being triggered on by an overvoltage surge, crowbar SCR operation is detected to generate a control signal to activate a timer which shuts off gate drive to the main bridge SCR's and thereby shuts down the bridge for a period of time sufficient to provide crowbar SCR recovery and cool off. In its preferred embodiment, the control signal is provided by the crowbar SCR gate to cathode voltage drop during protective operation, which signal is of relatively long duration, thus allowing the use of filters to eliminate spurious triggering of the timer by transient noise signals. Feedback from the switch means supplying gate drive to the bridge SCR's is used to provide a tapered charging characteristic. Temperature detection of the mounting base temperature of the semiconductors in the SCR/diode bridge may be used to shut off the gate drive to the main bridge SCR's to prevent excessive temperature rise of the semiconductor junctions.

23 Claims, 1 Drawing Sheet

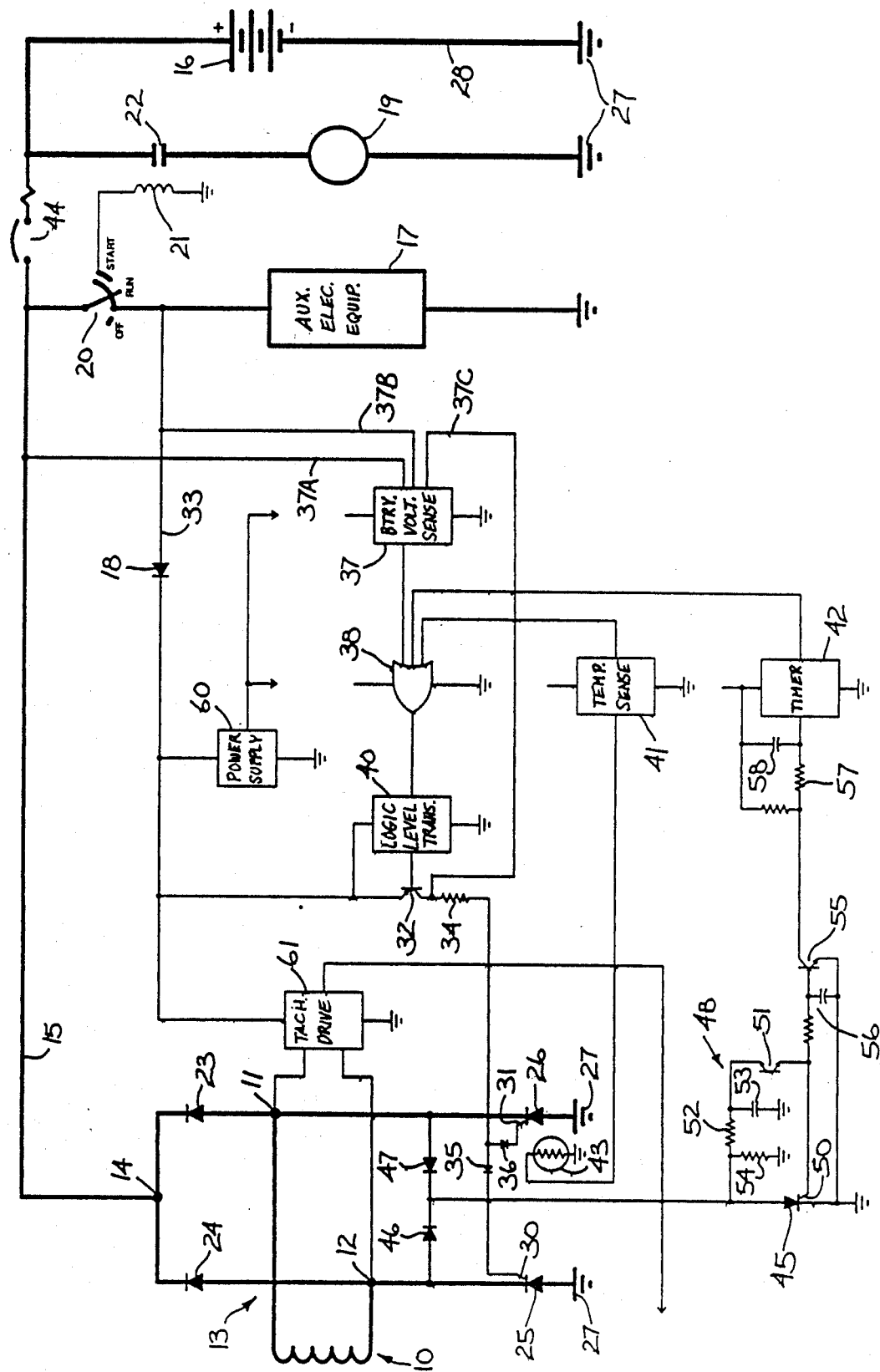

VOLTAGE REGULATORS FOR PERMANENT MAGNET ALTERNATORS

BACKGROUND OF THE INVENTION

The present invention pertains to an electrical supply system for an internal combustion engine having a flywheel-mounted permanent magnet alternator supplying a voltage regulator utilizing silicon controlled rectifiers (SCRs) and diodes connected as an SCR/diode bridge rectifier for controlling the current supplied to the DC portion of the electrical system. More particularly, the invention relates to a protective circuit means for assuring that the protective crowbar SCR device, utilized to protect the DC portion of the electrical system from excessive regulator output voltage, is allowed to cool off and adequately recover after it has been triggered by an overvoltage surge to shunt the associated alternator output current to ground.

The use of an SCR/diode bridge rectifier in the regulator of the electrical system of an internal combustion engine having a flywheel-mounted permanent magnet alternator is well known. Such a regulator provides full wave rectification of the AC input from the alternator to provide a DC output current for charging the battery that supplies the voltage for the DC portion of the system. The bridge rectifier circuit includes a diode or a silicon controlled rectifier (SCR) in each conducting branch. Each half cycle of alternator input to the bridge will provide a forward voltage bias to one of the bridge SCRs and the application of a simultaneous gate drive signal to that SCR will allow it to turn on and provide a positive output current from the bridge to the battery. As the current from the alternator to the bridge reverses for the next half cycle, the forward voltage bias is applied to the SCR in the other branch of the bridge simultaneously with a gate drive signal to turn on that SCR and again provide a positive output current to the battery. Thus, the bridge SCR's turn on and begin to conduct only when forward biased and when triggered by an appropriate gate drive signal. The battery is used to provide the source of gate current for the bridge SCR's and, by monitoring battery voltage, gate drive current is supplied to the SCR's only when the battery voltage drops below a detection level, thereby providing battery charge control.

If the regulator is providing DC output current and the battery suddenly becomes disconnected, or if there is an abnormally high impedance between the regulator and the battery or in the battery itself, the regulator output voltage would tend to rise to an undesirable level which might damage or destroy equipment or instruments in the electrical system. This voltage rise is due to the inherently high open circuit voltage of the permanent magnet alternator; whenever the load connected to the regulator becomes unable to accept the regulator output current, the alternator voltage and the regulator output voltage will rise. To avoid damage from a severe voltage surge, overvoltage protection is provided by utilizing a crowbar SCR means connecting each alternator AC input lead to ground. The crowbar SCR triggering circuit monitors the positive voltage appearing on both alternator AC input leads to the bridge and, should an overvoltage condition be detected, the crowbar SCR will be triggered and will then conduct the remaining half cycle of AC input current to ground. Typically, a separate crowbar SCR and associated triggering circuit has been used in each branch of the bridge, connected between an AC input and ground in parallel with one of the bridge SCR's. It is, however, also possible to use a single crowbar SCR and triggering circuit to monitor both AC input lines from the alternator to the SCR/diode bridge.

U.S. Pat. No. 4,410,847 discloses the use of dual crowbar SCR's for overvoltage protection in a conventional four diode bridge rectifier. U.S. Pat. No. 4,431,959 shows a regulator for a permanent magnet alternator using an SCR/diode bridge in which overvoltage protection is provided by a single zener diode. The high power dissipation inherent in a zener diode may not allow such a device to withstand a rapid succession of severe voltage surges.

The attractiveness of using a crowbar SCR for overvoltage protection resides in its inherent low voltage and low power dissipation when switched into a conducting state. As a result, a crowbar SCR experiences much lower energy absorption while performing its protective function than a zener diode and can normally withstand a rapid series of such surges without exceeding its safe temperature. However, an SCR is typically designed for operation at relatively low frequencies, such as 60 hertz, but when used as a protective crowbar SCR in the rectifying bridge for a permanent magnet alternator, the crowbar SCR may experience currents at frequencies which are 10 times greater. Thus, at relatively high engine and alternator speeds, the SCR/diode bridge, and the crowbar SCR protective device when triggered by an overvoltage, may experience full wave rectified current at 600 hertz or higher.

When combined with the characteristics of the permanent magnet alternator, the current passing through the crowbar SCR may then be such that the periods of low current are of insufficient duration to allow the SCR to turn off. Consequently, once the crowbar SCR had been triggered on by an overvoltage, it would be unable to turn off. Additionally, mere repetitive operation of the crowbar SCR in the absence of direct cooling, such as water cooling, which often is not practically available for the crowbar SCR, may cause it to overheat, resulting in the loss of gate control. The crowbar would then begin to turn on solely with the application of forward voltage, effectively staying on continuously. Under either of the above conditions, it is likely that the crowbar SCR would not be able to recover and cool off, and, as a result, quickly burn out.

It would, therefore, be desirable to have some means of assuring an appropriate period of recovery and cool off for the crowbar SCR means, whether utilizing one or two crowbar SCR's, whenever a crowbar is triggered to shunt to ground the current resulting from a transient overvoltage input to the bridge from the alternator.

SUMMARY OF THE INVENTION

The present invention provides means for assuring a period of cool off and recovery for a crowbar SCR triggered into conduction by an overvoltage input to an SCR/diode bridge. The device has particular utility in an electrical supply system for an internal combustion engine having a permanent magnet alternator wherein an SCR/diode bridge converts the AC input from the alternator to a DC output to maintain a charged battery in the electrical system.

The crowbar SCR cool off and recovery timer of the present invention includes a first circuit means for detecting triggering and conduction of the crowbar SCR and generating a signal representative of crowbar SCR operation. A second circuit means is responsive to the crowbar SCR operation signal to interrupt the gate drive to the main bridge SCR's to halt current flow therethrough for an appropriate period. Since current flow through a bridge SCR is necessary to power the crowbar SCR means, current flow through the crowbar means will also be halted. The second circuit means provides a cut off of gate drive to the bridge SCR's, thereby shutting off the bridge for a period sufficient to allow the crowbar SCR means to recover and cool off.

The first circuit means also includes the crowbar SCR triggering circuit which generates the triggering current pulse to the gate of the crowbar SCR means. In alternate embodiments, the signal representative of crowbar SCR operation may comprise the triggering current pulse to the crowbar gate itself or the gate to cathode voltage drop in the crowbar SCR after it has been triggered into conduction. However, because the triggering pulse is of short duration, the signal may be difficult to identify and capture in an area of high transient noise signals. It is preferred, therefore, to use the gate to cathode voltage drop to generate the crowbar operation signal because the signal voltage is available as long as current is flowing through the crowbar SCR. Thus, appropriate filtering of the transient noise signals may be utilized without affecting detection of the crowbar operating signal and, therefore, noise triggering of the cool off and recovery timer is made much more unlikely.

The signal representative of crowbar SCR operation is fed to the second circuit means which is, in turn, operatively connected to the source of gate drive current for the main bridge SCR's. The crowbar SCR operating signal is processed by the second circuit means to effectively shut off the gate drive current to the bridge SCR's. The second circuit means also includes a timing circuit effective to withhold gate drive current to the bridge SCR's for a period sufficient to allow the crowbar SCR means to cool off and adequately recover. In the preferred embodiment, this second circuit means is operative to disable, for the timed period, gated switch means used to supply gate drive to the bridge SCR's.

In addition, feedback from operation of the gated switch means is utilized to provide the regulator with a tapered output current to the battery.

BRIEF DESCRIPTION OF THE DRAWING

The single figure is a schematic of an electrical supply system for an internal combustion engine, including a flywheel-mounted alternator, an SCR/diode bridge rectifier, and the crowbar SCR protective circuit of the present invention.

DETAILED DESCRIPTION OF THE PREFERRED EMBODIMENT

An alternator output winding 10 of a permanent magnet alternator generates a single phase alternating current output to the inputs 11 and 12 of an SCR/diode bridge rectifier 13. The bridge rectifier 13 operates to provide full wave rectification and converts the alternating current at inputs 11 and 12 to a direct current at output terminal 14. The positive DC output current is conducted via positive lead 15 to a battery 16 to provide battery charging current. The DC output from the battery 16 also provides power to various auxiliary electrical equipment, identified generally at 17, as well as to supply engine cranking current to the starter motor 19, as by operation of the ignition switch 20 to energize the starter solenoid 21, which causes contacts 22 to close.

The SCR/diode bridge rectifier 13 includes a pair of bridge diodes 23 and 24 having their anodes connected to bridge input terminals 11 and 12, respectively, and their cathodes commonly connected via the output terminal 14 to the positive lead 15. A pair of silicon controlled rectifiers 25 and 26, comprising the main bridge SCR's, have their cathodes connected to input terminals 12 and 11, respectively, and their anodes connected to system ground 27. When applied to an internal combustion engine, the engine block is typically utilized as a common ground. Likewise, the negative battery lead as well as corresponding leads from the starter motor 19 and electrical equipment 17 are returned through the common ground 27.

During a half cycle of output from the alternator output winding 10, one bridge input terminal, for example input terminal 11, is positive with respect to input terminal 12. During that half cycle, bridge diode 23 and bridge SCR 25 are forward biased and, assuming bridge SCR 25 is turned on, provide a conducting path through the bridge to positive DC output terminal 14. During the next half cycle, the input terminal 12 is positive relative to input terminal 11, and bridge diode 24 and bridge SCR 26 are forward biased and, if bridge SCR 26 is turned on, provide a conducting path to output terminal 14. The SCR/diode bridge will conduct only when a forward biased bridge SCR 25 or 26 is turned on by the gate drive current supplied to the bridge SCR gate 30 or 31, respectively. Once turned on, the bridge SCR 25 or 26 will continue to conduct so long as current continues to flow above a holding level. In normal operation, the forward voltage bias across the bridge SCR reverses with each half cycle of alternator input thereby automatically terminating the holding current for the ensuing half cycle. Turn on current to the bridge SCR gates 30 and 31 is provided by a bridge drive circuit including a gate current source transistor 32 having its emitter connected to the RUN lead 33 operating essentially at the voltage of the battery 16. The collector of gate current transistor 32 is connected in series with a current limiting resistor 34 to the gates 30 and 31 of the bridge SCR's 25 and 26, respectively, via a pair of steering diodes 35 and 36, respectively. The steering diodes 35 and 36 automatically direct gate current to the bridge SCR whose gate is instantaneously at the most negative potential (i.e., the bridge SCR which has its cathode connected to the alternator input terminal 11 or 12 which is at the more negative polarity). Gate drive current for the bridge SCR's 25 and 26 is continuously available via the RUN lead 33 and diode 18, with base current supplied to turn on gate current transistor 32 whenever the voltage of battery 16 drops below a low voltage detection level. RUN lead 33 provides the power to operate the regulator and diode 18 is provided to protect the regulator's control circuits from an accidentally reverse-connected battery.

Battery voltage sensing circuit 37 monitors the battery voltage on positive lead 15 via main sensing input 37A and also on the RUN lead 33 via backup sensing input 37B. Without backup sensing, should main sensing input 37A become accidentally disconnected, the battery would be severely overcharged. With backup sensing, however, the voltage on the battery would be only modestly higher. Sensing circuit 37 includes a voltage level detecting circuit designed to output a logic low whenever the battery voltage drops below the regulated level (e.g., 14.5 volts). The logic low from voltage sensing circuit 37 propagates through positive logic OR gate 38 and logic level translator 40 to turn on transistor 32. However, gate current transistor 32 will not turn on unless the logic inputs to OR gate 38 from temperature sensing circuit 41 and timer circuit 42 are also low.

Sensing circuit 37 also receives a feedback signal from gate current source transistor 32 via feedback input 37C, which acts to provide the regulator with a tapered output characteristic, that is, an output current vs. output voltage characteristic that is approximately linear from maximum output current at a battery voltage of about 13.3 volts to zero output current at a battery voltage of about 14.5 volts. Sensing circuit 37 normally combines the signals on main sensing input 37A and feedback input 37C to produce an apparent battery voltage signal. The apparent battery voltage signal is subsequently filtered with a capacitor so that it cannot change rapidly. However, should the main sensing input 37A become disconnected, the signal on backup sensing input 37B would be utilized in place of the signal on input 37A to produce the sensed battery voltage signal to which the feedback signal is added to provide the apparent battery voltage signal. Feedback input 37C acts to provide the apparent battery voltage signal whenever gate current source transistor 32 is turned on. When gate current transistor 32 is turned off, however, feedback input 37C acts as though it were totally disconnected. Feedback input 37C typically utilizes a diode and one or more resistors to achieve the effect just described, although more complex feedback may also be used. The voltage level detecting circuit within sensing circuit 37 has a small amount of internal positive feedback to provide a rapid output transition between logic states, which therefore precludes any steady-state output other than a logic high or a logic low. Following the voltage level detecting circuit but still within the battery voltage sensing circuit 37 is a minimum on-time circuit, which acts as a simple pulse-stretcher for logic low inputs. The minimum on-time circuit is designed to output a logic low whenever the output of the voltage level detecting circuit goes to a logic low and to add an additional minimum time period also at the logic low output level. Typically, the additional time period in the logic low output state is 12 to 15 milliseconds. The additional minimum time period at logic low output assures that the SCR/diode bridge will be turned on for a period sufficient to force each branch of the bridge to carry its proper share of the load, no matter how short the time period that the voltage level detecting circuit exhibits its logic low output signal.

If the feedback input 37C is omitted, the tapered regulator output characteristic would not be present. Under such conditions an actual battery voltage signal would be produced by main sensing input 37A alone (or by backup sensing input 37B alone if input 37A was disconnected). Consequently, the output of the voltage level detecting circuit and the succeeding minimum on-time circuit would be a steady-state logic low when the actual battery voltage remained below about 14.5 volts, and the output of the voltage level detecting circuit and the succeeding minimum on-time circuit would be a steady-state logic high whenever the actual battery voltage remained above about 14.5 volts. The regulator would therefore provide no output current if the battery voltage was slightly above the 14.5 volt regulating level, but would provide maximum output current if the battery voltage was slightly below the 14.5 volt regulating level. There would obviously be no gradual increase in regulator output as the battery voltage dropped lower and lower relative to 14.5 volts, but rather the increase in regulator output would occur all at once, typically at about 14.5 volts.

However, if the feedback input 37C is present, then an actual battery voltage of only 13.3 volts, for example, with gate transistor 32 turned on, would produce the same apparent battery voltage signal as an actual battery voltage of 14.5 volts with gate transistor 32 turned off. In terms of its effect on the battery voltage signal, the feedback signal on feedback input 37C with gate current transistor 32 turned on will effectively add approximately 1.2 volts to the actual battery voltage. With the voltage level detecting circuit set to detect 14.5 volts, a tapered charging characteristic will be produced that operates over the range of 13.3 volts to 14.5 volts of actual battery voltage. Specifically, with the battery voltage about 14.5 volts the regulator would produce zero output, and if the battery voltage dropped below 13.3 volts the regulator would provide full output. With a battery voltage halfway between 13.3 volts and 14.5 volts, e.g., 13.9 volts, the apparent battery voltage signal without filtering would be 13.9 volts when gate current transistor 32 was turned off, and about 15.1 volts when gate current transistor 32 was turned on. In order to develop an unfiltered apparent battery voltage having an average value of 14.5 volts when the actual battery voltage is 13.9 volts, the gate current transistor 32 would have to switch on and off with a 50% duty cycle, developing an unfiltered apparent battery voltage signal of about 15.1 volts for half the time and 13.9 volts for the other half of the time. In other words, the actual battery voltage of 13.9 must be increased by an average 0.6 volts to attain the 14.5 volt detection level. This can only be done if the feedback signal is allowed to increase the apparent battery voltage by its 1.2 volt increment for 50% of the time. Because of the filtering of the apparent battery voltage signal, and because the voltage level detecting circuit is set to switch at 14.5 volts, the regulator would therefore switch on and off and would maintain the filtered apparent battery voltage in the near vicinity of 14.5 volts. With the regulator thus delivering zero output current for actual battery voltages above 14.5 volts and full output current for actual battery voltages below 13.3 volts and about 50% of full output current for an actual battery voltage halfway between 14.5 and 13.3 volts, a tapered output current vs. output voltage characteristic is therefore produced.

The temperature sensing circuit 41 is operatively connected to a thermistor 43 which monitors the mounting base temperature of the bridge SCR's 25 and 26 and outputs an overheating signal if a safe maximum SCR junction temperature bas been reached, which signal is processed by the temperature sensing circuit 41 to output a logic high to OR gate 38 to shut off the ate current transistor 32 and thus shut down the bridge 13. A logic high from the timer circuit 42, resulting from operation of the over voltage protection system of the present invention, will also shut down the bridge. The system will be described in detail hereinafter. Thus, logic lows on all of the inputs to OR gate 38 will turn on gate drive to the bridge SCR's and allow the bridge to operate, whereas a logic high from any one of the circuits 37, 41 or 42 will turn off gate drive to the bridge SCR's and thus shut down the bridge.

If the bridge 13 is delivering output to the positive lead 15 and the battery connection is broken, such as by inadvertent disconnection of the battery or tripping of a circuit breaker 44, the voltage limiting action of the battery would be lost and the output voltage of the bridge would likely rise to a high level, for at least the remainder of the half cycle of alternator output, capable of producing an overvoltage surge of a magnitude and duration sufficient to damage or destroy some of the connected electrical equipment 17. To protect against damage from such an overvoltage surge, the bridge rectifier 13 includes a crowbar SCR 45 connected in parallel with the main bridge SCR's 25 and 26 and adapted to be turned on by an overvoltage signal and to conduct the overvoltage current entering the bridge 13 at either of the input terminals 11 or 12 directly to ground. More specifically, the cathode of the crowbar SCR 45 is connected to ground and the anode is connected via overvoltage control diodes 46 and 47 to the cathodes of bridge SCR's 25 and 26, respectively. A positive overvoltage transient on either input 11 or 12 to the bridge will pass through the respective control diode 47 or 46, forward bias the crowbar SCR 45, and simultaneously provide a voltage to the crowbar SCR triggering circuit 48.

It is desirable to have the crowbar SCR 45 turn on quickly in the presence of an overvoltage and a rapid and relatively strong triggering pulse to the gate 50 of the crowbar SCR 45 should be provided by the triggering circuit 48. Preferably, the triggering device comprises a diac 51 connected between the anode and gate 50 of crowbar SCR 45. The triggering circuit also includes an RC filter to filter out extremely short duration voltage spikes, due for example to bridge rectifier switching transients, to prevent false triggering of the crowbar SCR. The filter is comprised of a resistor 52 and capacitor 53. The diac 51, which may typically be selected to conduct at a potential of about 30 volts, may utilize the RC circuit to provide a capacitive discharge triggering to establish a fast, powerful pulse of gate triggering current to the crowbar SCR. To prevent the storage in capacitor 53 of a charge only slightly below the diac triggering voltage, a resistor 54 is connected to ground to drain such charges. Otherwise, a relatively high undissipated charge in capacitor 53 with only a small additional transient voltage might result in a triggering pulse.

Instead of a diac 51, other types of triggering devices may be used, such as a pilot SCR, a zener diode, a silicon unilateral switch, or a unijunction transistor. It is very desirable, however, that the triggering circuit send a fairly large and fast triggering pulse into the gate of the crowbar SCR.

A transient overvoltage condition, resulting for example from a battery cable disconnection, should theoretically last for only the remainder of the alternator half cycle and, in the arrangement just described, trigger the crowbar SCR 45 to harmlessly shunt the over voltage current to ground With the battery disconnected, the bridge should be automatically turned off because the gate drive current for the bridge SCR's 25 and 26 depends on battery voltage. However, as indicated, transient voltages in the electrical system may provide sufficient power to turn on the gate current transistor 32 and trigger the bridge SCR's into conduction even though the battery is disconnected. One such voltage source may be the battery itself. In marine applications it is quite common for the battery to be frequently removed from the boat and reinstalled again, and the connections to the battery are sometimes insufficiently tightened. During operation of the engine such connections may become loosened and electrically intermittent. When such an intermittent connection is broken, an overvoltage surge may result, which would cause the crowbar SCR to be triggered. Shortly thereafter the connection may become re-established, which would allow the bridge to be turned back on again, and shortly thereafter the connection could again open up. This process could go on indefinitely. Another such voltage source might be internal capacitance in the regulator itself which gets recharged every time the bridge turns on. Still another might be a piece of electrical equipment 17 which becomes a current source, for example, a permanent magnet DC motor when operating current is terminated, can act as a generator while it is coasting to a stop. Once the crowbar SCR 45 is triggered, and as long as current continues to flow in the bridge, the crowbar SCR 45 will continue to conduct, receiving full wave rectified current from the alternator inputs 11 and 12. At high engine speeds and consequent high frequency current input with practically no time to turn off between half cycles, the crowbar SCR will effectively be in continuous conduction, a mode for which it is typically not designed or cooled, and will soon overheat and burn out. Under such various conditions as described, the only way to positively assure recovery for the crowbar SCR is to halt current flow through the bridge by interrupting gate drive to the main bridge SCR's 25 and 26. Further, current flow through the bridge must be interrupted for a time period sufficient to allow the crowbar SCR to cool off and recover.

The present invention provides means for sensing overvoltage operation of the crowbar SCR and utilizing a signal representative of crowbar operation to turn off the gate current transistor 32, thereby interrupting gate drive to the main bridge SCR's and turning off the bridge. The timer circuit 42 assures that gate drive to the bridge SCR's is interrupted for a period sufficient to allow cool off and recovery of the crowbar SCR 45.

In one embodiment, the triggering pulse resulting from firing of the diac 51 may be utilized to signal operation of the crowbar SCR and commence the timed shutoff of the bridge. However, the diac triggering pulse is of very short duration yet it must be captured by the timer circuit 42 which, in the regulator environment is typically located in an area of high transient noise voltages. If the timer circuit is constructed to reject transient noise pulses, the short duration crowbar SCR triggering pulse may also be rejected and the timer circuit not properly activated. On the other hand, if the circuit is made sensitive enough to assure pickup of the crowbar SCR triggering pulse signal, it is likely that transient noise signals will also be picked up and unnecessarily turn off the bridge.

In the preferred embodiment, positive detection of operation of the crowbar SCR utilizes the SCR gate to cathode voltage signal which rises when the crowbar SCR is turned on and conducting The gate to cathode voltage is about the same as the voltage drop between the SCR anode and cathode which may be about 1.5 volts. Further, the gate to cathode voltage provides a signal that continues as long as the crowbar SCR is conducting The gate to cathode voltage signal is used to provide base current to turn on NPN transistor 55 connected as shown with its emitter connected to the cathode of crowbar SCR 45. Because of the relatively long duration of the SCR gate to cathode voltage signal used to turn on transistor 55, an RC filter 56 may be used to remove the high RFI transients typical of this type of rectifier bridge, thereby preventing spurious triggering of the transistor 55.

When the crowbar SCR 45 is fired and transistor 55 is turned on, the signal on the collector 10 of transistor 55 is negative going, thus requiring a timer circuit 42 which is triggered on a falling input. Thus, timer circuit 42 may comprise a conventional "555" timer circuit, or a low-power CMOS version thereof, such as an Intersil ICM7555. Such a timing circuit utilizes an external capacitor and resistor (not shown) to provide the timed output. Although the timer may be set to provide a typical cool off and recovery period of 60 milliseconds, the time period is not particularly critical and may be varied widely, so long as a short dead period and sufficient cool off period is provided before the regulator bridge is allowed to again turn on. The negative going triggering input drives the output of the timing circuit 42 high and the high signal to OR gate 38 propagates through OR gate 38 and logic level translator 40 to turn off gate current transistor 32, thus removing the gate drive to the bridge SCR's for the period established by the timing circuit. An additional RC filter, comprising resistor 57 and capacitor 58, may be used to filter high frequency voltage transients and help prevent false triggering of the timer circuit 42. After the timer circuit has timed out, it is automatically reset to output a logic low which is coupled to OR gate 38 allowing gate current transistor 32 to be again turned on (providing neither a bridge over-temperature nor a high battery voltage signal exists as a high input to OR gate 38). In other words, the logic of the system requires all three inputs to OR gate 38 to be low to turn on the gate current transistor 32, whereas a logic high to the OR gate from any one of circuits 37, 41 or 42 will turn off transistor 32 and gate drive to the bridge SCR's 25 and 26.

Circuits for sensing operation of the crowbar SCR 45 and triggering the recovery timer may utilize semiconductor devices other than the NPN transistor 55 of the preferred embodiment. Also, timing devices other than integrated circuit timers may be used. For example, a semiconductor switching device having an input characteristic similar to an NPN transistor, but having an output characteristic similar to one of the members of the thyristor family may be used to trigger a recovery timer. Such a device may comprise a small, sensitive gate SCP or a silicon-controlled switch. In response to the crowbar SCR gate to cathode voltage signal, such a device may be selected to turn on and latch on for all values of output current above a holding current level. A relatively simple timing device utilizing one of the foregoing switches may comprise a timing capacitor having a relatively slow rate of recharge. The capacitor is quickly discharged when the semiconductor switch turns on. The capacitor voltage is monitored by a transistor connected as an inverter to provide a logic high signal to OR gate 38 to shut down the bridge which will stay off until the capacitor is sufficiently recharged, thus providing the recovery time period.

The system also includes a power supply 60 which may be of conventional design and provides a fairly closely regulated voltage output to supply operating power and reference voltage signals to the various circuits 37, 38, 41 and 42. The input to the power supply 60 comes from the RUN lead 33, the voltage on which normally varies from a low battery voltage of about 12 volts to a fully charged battery voltage of 14.5 to 15 volts. During overvoltage conditions, the voltage on the RUN lead 33 may rise to about 30 to 35 volts before the crowbar SCR turns on and kills the overvoltage. Power supply 60 must be designed to 10 safely withstand such voltages logic level translator 40, gate current drive transistor 32 and inputs 37A, 37B of battery voltage sensing circuit 37 must also be designed to withstand overvoltage on the RUN lead. The power supply 60 provides a regulated output of typically five to six volts.

The temperature sensing circuit 41 comprises a conventional comparator circuit which compares the temperature-dependent voltage drop developed by temperature-sensing thermistor 43 with a reference voltage, and when the thermistor voltage drop reaches the reference, the comparator output is switched high. The high input to OR gate 38 propagates through to turn off the gate current transistor 32 which remains off until a safe temperature is sensed by the thermistor.

The logic level translator 40 may be of any convenient construction which will convert a logic signal from OR gate 38 ranging from a logic low voltage at essentially ground potential to a logic high voltage in the range of the regulated supply voltage of five to six volts, to a current and voltage range in the output of the translator to the base of transistor 32. With a logic low at its input, translator 40 will draw base current from transistor 32, thereby turning transistor 32 on and causing its base voltage to drop about 0.6 volts below its emitter voltage. Conversely, with a logic high at its input, translator 40 will effectively raise the voltage on the base of transistor 32 to match the voltage on the emitter, thereby turning it off.

The system also includes a tachometer drive circuit 61 which receives its input signals directly from the rectifier bridge input terminals 11 and 12 and provides an output frequency representative of engine speed. Tachometer drive circuit 61, however, forms no part of the present invention.

The crowbar cool off and recovery timer of the present invention provides a means of protecting the crowbar SCR which is vulnerable to overheating and potential burnout as a result of its unique, yet most effective application in an SCR/diode bridge. The main bridge SCR's 25 and 26 are of a conventional construction and may be obtained in a press fit housing in which the SCR anode is electrically connected to the housing, whereby the housing may be pressed into a grounded, heat dissipating heat sink. However, the electrical connection of the crowbar SCR 45 is just opposite, requiring its cathode to be connected to ground, and SCR's are not typically made with a cathode electrically connected to a press fit housing. Thus, a crowbar SCR when applied as described hereinabove, cannot be pressed into a grounded, heat dissipating heat sink and cooled in the same manner as the bridge SCR's. Furthermore, for economy, it is desirable to utilize a smaller SCR for the normally infrequent crowbar application than the SCR's used in the main bridge. Thus, the application of a single crowbar SCR in the protective circuit for a permanent magnet alternator, as described in the preferred embodiment, results in potential exposure to relatively high amplitude, high frequency, full wave rectified current providing such short turn-off periods between successive half waves of current that the SCR cannot recover. The cool off and recovery timer of the present invention addresses each of the foregoing considerations and provides protection for the crowbar SCR which does not inhibit its effectiveness in protecting the electrical system from excessive overvoltages.

Various modes of carrying out the invention are contemplated as being within the scope of the following claims particularly pointing out and distinctly claiming the subject matter which is regarded as the invention.

I claim:

1. In an electrical system for an internal combustion engine having a permanent magnet alternator, said system including a bridge rectifier for converting the alternator output to a positive direct current output to the system, said rectifier containing bridge control SCR's connected to receive continuous gate drive current and a crowbar SCR for protecting said system against overvoltage, a crowbar SCR recovery timer comprising:

first circuit means for sensing operation of said crowbar SCR and for generating a signal representative of said operation; and, second circuit means responsive to said crowbar SCR operating signal for interrupting gate drive current to the bridge control SCR's and temporarily shutting down said bridge rectifier for a time period sufficient to allow recovery of said crowbar SCR.

2. The invention as set forth in claim 1 wherein said first circuit means includes means responsive to alternator overvoltages of positive polarity relative to ground for triggering said crowbar SCR into conduction and said second circuit means is responsive to the crowbar SCR gate to cathode voltage drop after said crowbar SCR has been triggered.

3. The invention as set forth in claim 2 wherein the time period of shutdown for the bridge rectifier is sufficient to allow cool off of said crowbar SCR.

4. In an electrical system for an internal combustion engine having a permanent magnet alternator, said system including a battery and a converter having an input connection from the alternator and an output connection to the battery and SCR/diode bridge for converting the alternator input to provide a positive direct current output to the battery, said SCR/diode bridge including alternately conducting branches each of which includes a bridge diode having its cathode connected to the positive output and a bridge SCR having its anode connected to ground, and a crowbar SCR operatively connected to the bridge means for protecting said system against alternator input overvoltages of positive polarity relative to ground, said crowbar SCR connected in parallel with said bridge SCR's and having its cathode connected to ground, a crowbar SCR recovery timer comprising:

a source of continuous gate drive current for said bridge SCR's;

first circuit means for sensing operation of said crowbar SCR and for generating a signal representative of said operation; and, second circuit means responsive to said operation signal for interrupting the gate drive to the SCR/diode bridge to halt current flow through the bridge SCR's for a time period sufficient to allow the crowbar SCR means to recover.

5. The invention as set forth in claim 4 wherein said first circuit means includes crowbar SCR triggering means responsive to a positive overvoltage input form the alternator to a conducting branch of the bridge for generating a triggering current pulse to the gate of said crowbar SCR to cause the crowbar SCR to divert the current flow from the conducting bridge branch to ground and wherein said triggering current pulse is effective to generate the crowbar SCR operation signal.

6. The invention as set forth in claim 5 wherein said source of continuous bridge SCR gate drive current includes first gated switch means operative to supply gate drive current to the bridge SCR's when the battery voltage is below a selected regulated level.

7. The invention as set forth in claim 6 wherein said second circuit means includes timing means effective to disable said first gated switch means for said recovery time period.

8. The invention as set forth in claim 7 wherein the crowbar SCR triggering means comprises a diac.

9. The invention as set forth in claim 7 wherein the crowbar SCR operation signal comprises a crowbar SCR gate to cathode voltage signal generated after the crowbar SCR has been triggered into conduction.

10. The invention as set forth in claim 9 including second gated switch means responsive to said gate to cathode voltage signal for operating said timing means.

11. The invention as set forth in claim 10 wherein said second gated switch means comprises an NPN transistor connected to receive base current while said crowbar SCR is conducting.

12. The invention as set forth in claim 10 wherein said timing means comprises a timer integrated circuit including a trigger input responsive to the output of said second gated switch means to provide an output signal for a time equal to said recovery time period.

13. The invention as set forth in claim 10 wherein said second gated switch means comprises a semiconductor device having an input characteristic similar to an NPN transistor and an output characteristic similar to a thyristor.

14. The invention as set forth in claim 13 wherein said timing means comprises a timing capacitor adapted to be discharged by operation of said semiconductor device and having a rate of recharge adequate to provide said recovery time period.

15. The invention as set forth in claim 6 wherein the source of gate drive current for the bridge SCR's includes voltage level detecting means responsive to a signal representative of sensed battery voltage below the regulated level for supplying gate current to said bridge SCR's from said first gated switch means.

16. The invention as set forth in claim 15 including third circuit means for providing feedback of a voltage signal from the first gated switch means to the voltage level detecting means when said first gated switch means is turned on and for adding said feedback signal to the sensed battery voltage signal and including filtering means to effectively average the resultant signal to provide an apparent battery voltage signal, whereby the voltage level detecting means is responsive to the apparent battery voltage signal.

17. The invention as set forth in claim 16 wherein the voltage level detecting means is responsive to said apparent battery voltage signal when the actual battery voltage lies within the range of the regulated voltage level and the regulated voltage level less the feedback signal voltage, and said voltage level detecting means maintains said apparent battery voltage signal close to the regulated level by turning the first gated switch means on and off as required.

18. The invention as set forth in claim 16 wherein the response of the voltage level detecting means effects a tapered output current to the battery from zero when the actual battery voltage is at the regulated voltage level to a maximum when the actual battery voltage is at the regulated voltage less the feedback signal voltage.

19. The invention as set forth in claim 6 wherein the source of gate drive current for the bridge SCR's includes temperature sensing means arranged to sense the mounting base temperature of the semiconductors in the said SCR/diode bridge.

20. The invention as set forth in claim 19 including temperature detecting means responsive to said temperature sensing means to detect overtemperature of said mounting base, wherein said temperature detecting means, upon detecting overtemperature of said mounting base, turns off said first gated switch means and thereby interrupts the supply of gate current to said bridge SCR's to prevent further heating of the semiconductors in the said SCR/diode bridge.

21. In an electrical system for an internal combustion engine having a permanent magnet alternator, said system including a battery and a converter having an input connection from the alternator and an output connection to the battery and SCR/diode bridge means for converting the alternator input to provide a positive direct current output to the battery, and crowbar SCR means operatively connected to the bridge means for protecting said system against alternator input overvoltages of positive polarity relative to ground, gated switch means operative to supply gate drive current to the bridge SCR's including:
   first circuit means for combining in an additive sense a first voltage signal representative of the sensed battery voltage and a second voltage signal representative of the battery voltage range over which tapered charging is desired, wherein the said second voltage signal is added to said first voltage signal only when said gated switch means is supplying gate drive current to said bridge SCR's, the combined signal comprising a modified sensed battery voltage signal;
   second circuit means comprising filter means for effectively averaging said modified sensed battery voltage signal to produce an apparent battery voltage signal;
   third circuit means comprising a voltage level detecting circuit responsive to said apparent battery voltage signal to generate an undercharge signal whenever said apparent battery voltage signal falls below a selected reference voltage;
   fourth circuit means comprising pulse-stretching means responsive to said undercharge signal to generate an undercharge pulse signal from said undercharge signal, each pulse of said undercharge pulse signal having a pulsewidth equal to or greater than a selected minimum pulsewidth to ensure that each period of turn on of said SCR/diode bridge is long enough to exercise approximately equally the branches of said bridge, wherein the complement signal to said undercharge pulse signal represents an overcharge pulse signal and is produced from said undercharge pulse signal by said fourth circuit means; and
   fifth circuit means, comprising a multiple-input OR gate means having at least one input responsive to said overcharge pulse signal to turn off said gated switch means, thereby cutting off gate drive current to said bridge SCR's while said overcharge pulse signal is present.

22. The invention as set forth in claim 21 including:
sixth circuit means for sensing operation of said crowbar SCR means and for generating a signal representative of said crowbar SCR operation; and,
seventh circuit means responsive to said signal representative of said crowbar SCR operation for generating a time period signal suitable for crowbar SCR recovery; and,
wherein said fifth circuit means further comprises at least one input responsive to said time period signal produced by said seventh circuit means to turn off said gated switch means, thereby cutting off gate drive current to said bridge SCR's while said time period signal is present.

23. The invention as set forth in claim 21 including:
sixth circuit means comprising temperature sensing means arranged to sense the mounting base temperature of the semiconductors in the said SCR/diode bridge;
seventh circuit means responsive to said temperature sensing means to detect overtemperature of said mounting base and to produce an overtemperature signal in response to such detection; and,
wherein said fifth circuit means further comprises at least one input responsive to said overtemperature signal produced by said seventh circuit means to turn off said gated switch means, thereby cutting off gate drive current to said bridge SCR's while said overtemperature signal is present.

* * * * *